No. 761,755. Patented June 7, 1904.

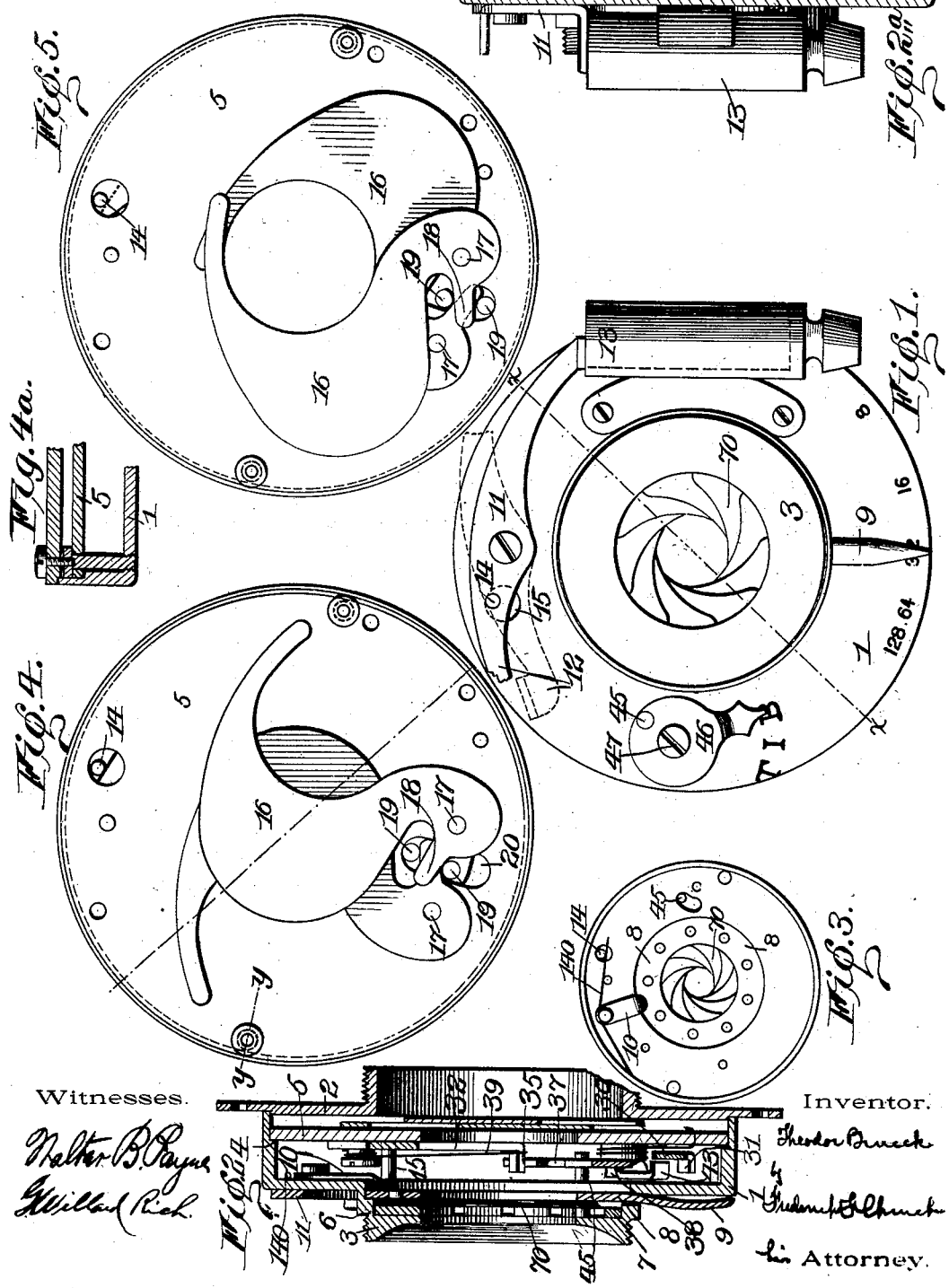

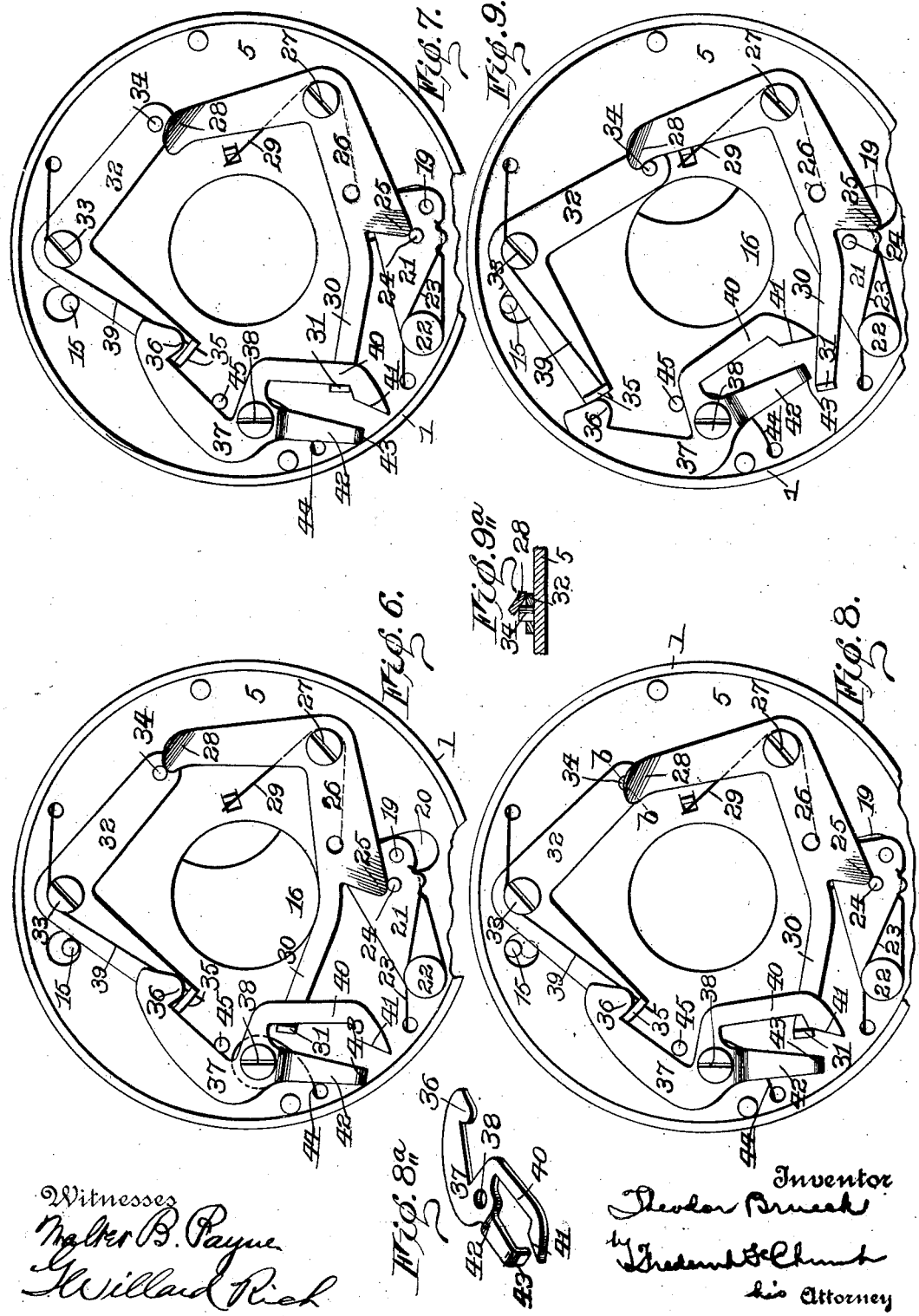

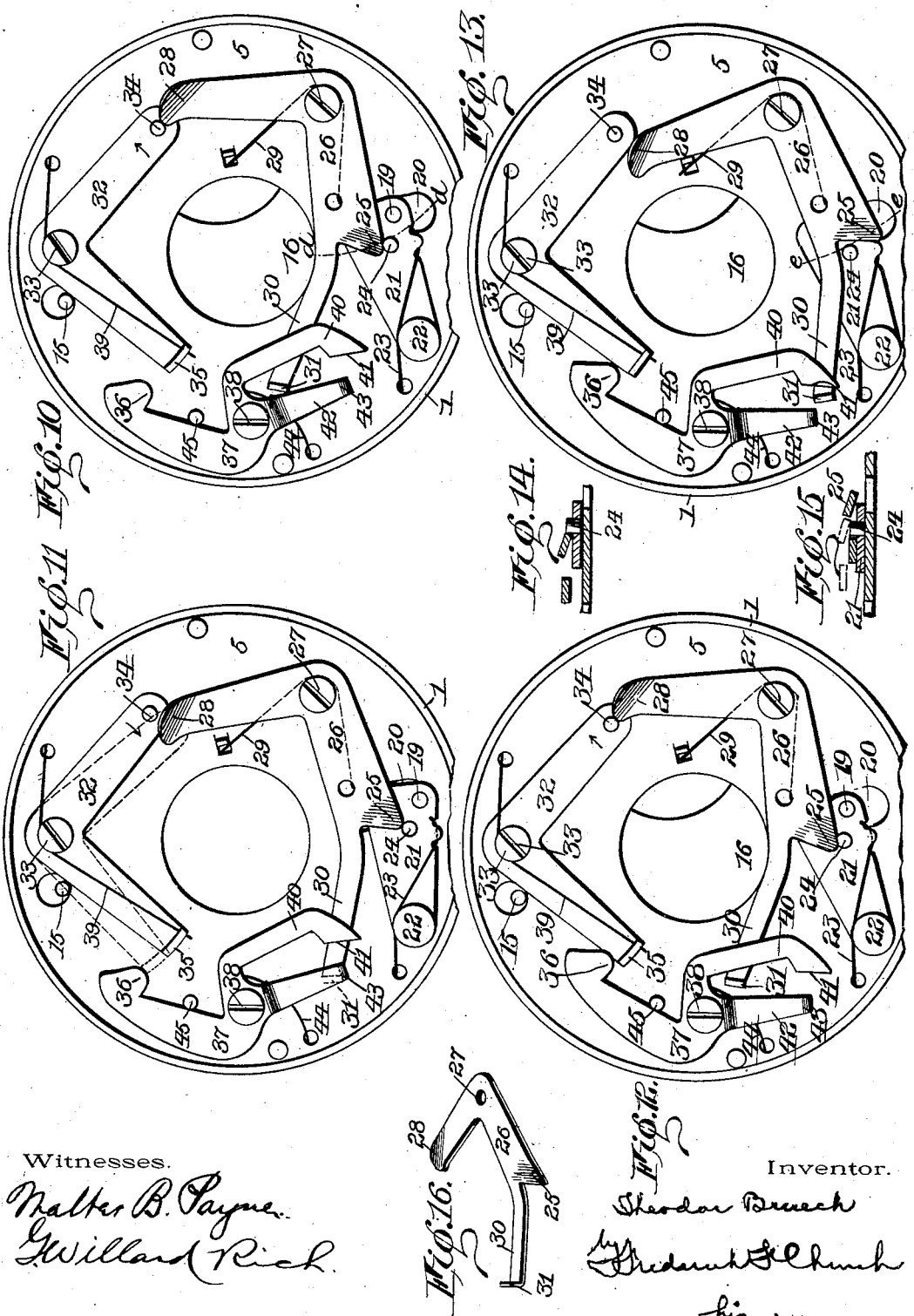

UNITED STATES PATENT OFFICE.

THEODOR BRUECK, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC SHUTTER.

SPECIFICATION forming part of Letters Patent No. 761,755, dated June 7, 1904.

Application filed February 25, 1901. Serial No. 48,729. (Model.)

*To all whom it may concern:*

Be it known that I, THEODOR BRUECK, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photographic shutters, and has for its object to provide one composed of few and simple operating parts which is adapted for making time, instantaneous, and bulb exposures, and of being operated and controlled by the movement of a single part under the control of the operator; and it consists in certain improvements hereinafter described, the novel features being pointed out particularly in the claims at the end of this specification.

In the accompanying drawings, Figure 1 is a front elevation of a shutter embodying my invention; Fig. 2, a sectional view taken on the line $x\, x$ of Fig. 1; Fig. $2^a$, a vertical sectional view through the back plate, showing the front plate broken away at the edge only; Fig. 3, a view of the rear side of the front casing-section with the diaphragm therein; Figs. 4 and 5, views of the shutter with the rear cover-plate of the casing removed, showing the shutter-leaves closed and open; Fig. $4^a$, a sectional view on the line $y\, y$ of Fig. 4; Figs. 6, 7, 8, and 9, views of the operating parts of the shutter when making a time exposure; Fig. $8^a$, a perspective view of the controlling member detached; Fig. $9^a$, a sectional view on the line $b\, b$ of Fig. 8; Figs. 10 and 11, views showing the shutter operating and controlling parts when making a bulb exposure; Figs. 12 and 13, views showing the position of the operating and controlling parts during and after making an instantaneous exposure; Fig. 14, a sectional view on the line $d\, d$ of Fig. 10; Fig. 15, a sectional view on the line $e\, e$ of Fig. 13; Fig. 16, a perspective view of the master member or lever.

Similar reference-numerals in the several figures indicate similar parts.

The casing of my present shutter is preferably formed of a front casing-section 1 and the back plate or section 2, secured thereon in any suitable manner and adapted to be attached to a camera-front. The front section 1 is preferably formed of a single piece of material having an annular projection or extension 3, preferably exteriorly at the front, adapted for the application of a lens tube or ring and at the rear provided in the enlarged annular rearwardly-extending flange with the shoulder or ledge 4, upon which rests the diaphragm or septum 5, carrying the operating parts of the shutter and secured there in any suitable manner. The extension 3 is provided with the inwardly-extending flange $3^\times$, and in the rear thereof is an annular recess 6, in which is located an iris-diaphragm embodying a stationary ring or plate 7, held in the annular recess by friction or otherwise, the leaves or blades 70 and the annular rotary plate 8 provided with an operating arm or index 9, extending through a segmental slot in the casing and coöperating with a scale indicating the sizes of diaphragm-openings upon the front. The leaves 70 of the diaphragm are curved, as usual, and are provided with pins entering apertures and slots and being pivotally connected in any suitable manner with the rings 7 and 8, so that by the relative rotary movement of the rings the size of the aperture formed by the blades may be regulated as desired. A diaphragm of this general description is shown in United States Letters Patent No. 617,007, granted the Bausch & Lomb Optical Company for a microscope. The diaphragm as a whole is held in position in the annular recess or seat 6 by a small clip or finger 10, coöperating with the inner side of the ring 8 and preventing its lateral movement therein, although not interfering with the necessary rotary adjustment. The inner face of the diaphragm-rings are located below the plane of the inner face of the section 1, so as to be compact and out of the way of the operating parts, and while I prefer to make this casing-section with the exterior annular flange this could be arranged otherwise, if desired. This diaphragm and its arrangement in the casing I do not claim herein, as it will be made the subject of a divisional application. Pivoted upon the outer face of the casing is a lever 11, having an operating-handle 12 at one end and at the other resting upon the upper end of a movable cylinder 13, forming part of the operating pneumatic engine, and said lever is provided upon its inner side with a pin 14, extending through an aperture 15 into the casing into position to operate upon and control the operating mechanism located therein, as will be described. A spring 140, operating on the pin 14, Fig. 3, serves to move the lever 11 to normal position.

The shutter members and the parts operating and controlling the same are supported upon the plate or septum 5, which has the central aperture in axial alinement with the lens, and while the shutter proper or the devices which control the passage of light may be of any suitable description I prefer to employ two similar plates or wings 16, each having apertures pivoted at 17 upon pins projecting from the plate or septum 5 and provided with projecting tongues 18, extending between pins 19, operating through a slot 20 in the septum 5 and connected to an actuating member or lever 21, pivoted at 22 upon the front side of said septum. A spring 23, preferably coiled around the pin 22 and connected at one end to the septum and to the lever 21, moves the free end of the lever toward the center, normally maintaining the shutters closed, as shown in Fig. 4, and the connection between the shutter-wings and lever is such that when the latter is moved outwardly against its spring the wings or leaves will be separated to open the shutter, as shown in Fig. 5. The two shutter wings or leaves are similar and interchangeable and formed of thin sheet material, such as hard rubber, and may be readily cut by a single die.

The actuating member or lever 21 is provided on its front side with a stud or projection 24, with which is adapted to coöperate an operating shoulder or projection 25 on a master member or lever 26. The master member, preferably formed of a single piece of spring material, such as steel or brass, is pivoted upon a screw or stud 27 and is of the general shape shown in Fig. 16, being provided on one side of the center with an arm or extension 28, by which it is turned upon the pivot against the tension of the spring 29, and also having an arm or extension 30, having a lug or projection 31 on its end by which its operation is controlled.

32 indicates an operating member or lever in the form of a bell-crank pivoted to a screw 33 on the septum 5 and having upon one of its arms a pin or projection 34, coöperating with the end 28 of the master member 26, and upon its other arm a projection or lug 35, adapted to coöperate with a projection 36 on a controlling member 37, pivoted upon a screw 38, also on the plate 5.

39 indicates a spring extending around the screw 33 and connected at one end to the stationary plate 5 and at the other to the lever or member 32 and tending to move the arm carrying the lug 35 into engagement with the controlling member 37 and into contact with the pin 14 upon the rear side of the lever 11, holding the latter normally in the position shown in full lines in Fig. 1. The connections between the stud 34 on the operating member 32 and the end 28 of the master member 26 and between the stud 24 on the lever 21 and the lug or shoulder 25 on the master member 26 are what might be termed "latch" connections—that is to say, are such that when the projection 34 moves downwardly it engages the inner side of the member and turns the latter upon its pivot until by reason of the intersecting arcs traversed by the parts it passes off the end; but when said pin or stud operates in the opposite direction it will move the end of the master member laterally or in a plane at right angles to its axis and pass freely beneath it without turning it on its pivot, and also when the master-lever moves downward it will turn the lever 21 on its pivot until the projection 25 passes off the stud 24 by reason of the different arcs through which these parts pass, and when said master member is moved in the opposite direction it will pass over the stud without operating it. These latch connections are formed by making the master member of spring material, as described, and beveling or inclining the under sides of the engaging portions, as shown by the sectional views, Figs. 9ª, 14, 15, and the perspective view, Fig. 16. From this construction it follows that when the operating member 32 is moved against its spring by the pin 14 the master member will be turned on its pivot, as shown in Fig. 12, and after the latch end 25 has passed over the pin 24 on the lever 21 the master member will be released from the operating member and its spring 29 will move the lower end downward, causing the downward movement of the lever 21 and the separation of the shutter-leaves, and then the latch projection 25 passing off the pin the lever 21 and the leaves will be returned to first position by the spring 23, closing the shutter again.

The controlling member 37 is provided with an arm 40, having an inclined time stop or shoulder 41 on the end, and also with an arched arm 42, having a bulb-stop projection 43 on the under side and substantially in the plane of the shoulder 41 or of the plane of movement of the lug 31, while at its opposite end it has the rounded and inclined projection 36, coöperating with the operating lever or member 32. The stops 41 and 43 are adapted to coöp- erate with the lug 31 on the master member to detain the latter and hold the shutter open during the making of time and bulb exposures, and the controlling member is operated in the direction of the arrow, Fig. 13, by means of a suitable spring 44, the position occupied by said controlling member being regulated by an adjustable stop or pin 45, secured to an index arm or plate 46, pivoted at 47 to the outside of the front section of the casing, said index being adapted to coöperate with the characters "T," "I," "B," indicating, respectively, time, instantaneous, and bulb exposures.

It will be noticed that the pin 45 on the index 46 engages the controlling member 37 on its inner side and above its pivot 38, so that the member actuated by the spring 44 is held in contact with the pin, and the stops 41 and 43 at its lower end are positioned relative the projection 31 on the master member to permit the parts being operated for an instantaneous, time, or bulb exposure, as desired, according to the adjustment of the pin 45, as will be further explained. The stop-pin 45, however, only limits the movement of the member 37, and the upper end of the latter is free to move outwardly against the tension of the spring 44 whenever its projecting end 36 is engaged by the lug 35 on the operating-lever 32 either for the purpose of allowing the lever 32 to return to its normal position, from which the master member may be subsequently operated, or to move the stops 41 and 43 out of the path of the lug 31, allowing the closing of the shutter-leaves to complete either a time or bulb exposure. The position of the levers 32, 26, and 37 previous to making each kind of exposure is shown in Fig. 9, where the upper end of the controlling-lever is moved outwardly away from the pin 45, and it is to this position that the lever is moved to relieve the master member from either the position shown in Fig. 8 or in Fig. 11 to complete a time or bulb exposure, as illustrated, respectively.

*Instantaneous exposures.*—When the index 46 coöperates with the letter "I" on the casing, indicating instantaneous exposures, the controlling member 37 is in the position shown in Fig. 12, so that both stops 41 and 43 thereon are out of the path of the projection 31 on the master member. Then the operator (by means of the lever 11 and pin 14 thereon) actuates the operating member 32 from the position shown in Fig. 9 to that shown in Fig. 12, turning the master member until the latch projection 25 thereon is above the pin 24 on the shutter member 21, placing the spring 29 under tension, and when the stud 34 passes off the latch end 28 of the master-lever (see Fig. 12) the master member moving down through its full stroke opens the shutter, and when the latch projection 25 passes off the projection 24 on lever 21 the shutter is closed again by the spring 23.

*Time exposures.*—When it is desired to make a time exposure, the index 46 coöperates with the letter "T," and the pin 45, connected thereto, is in the position shown in Figs. 6, 7, and 8. This adjustment permits the controlling member 37 to move, so that the abrupt portion of the time-stop 41 is in the path of the projection 31 on the master member, so that when the operating member is moved as before and sets and releases the master member the latter will engage the lever 21, throwing the shutter open, as in Fig. 7. Then as the pressure on the operating member 32 is relieved its spring will cause it to move to the position shown in Fig. 8, where it engages with the abrupt shoulder of the projection 36 on the controlling member, which prevents the return of the latter to normal position, and this movement has brought the inclined surface of the time-stop 41 into the path of the projection 31 on the master member, holding the latter and retaining the shutter open, as shown in Fig. 8, in which position the parts may be left as long as desired. When it is desired to close the shutter again, a second movement of the operating member 32 against the tension of its spring will disengage the projection 35 on the operating member from the shoulder 36 and permit the master member operating on the inclined surface of the stop 41 to turn the controlling member against its spring, relieving itself therefrom, and continuing its movement downward releases the stud 24 and permits the lever 21 to be operated by its spring 23 to close the shutter, the parts then assuming the position shown in Fig. 9.

*Bulb exposures.*—When it is desired to make a bulb exposure—that is, one in which the shutter is held open during the continued pressure upon the operating member or the bulb of the pneumatic engine—the index 46 coöperates with the letter "B" on the scale and the stop-pin 45 is in the position shown in Figs. 10 and 11 and holds the controlling member 37, so that only the stop 43 thereon extends in the path of the projection 31 on the master member. The operating member is now moved as before to set and release the master member, and the latter moves from the position in Fig. 10, where it is just about to be released from the operating member, to that shown in Fig. 11, where the projection 31 is engaged by the bulb-stop 43 on the member 37, the shutter being held open in this position because the latch projection 25 has not passed off the pin 24 on the lever 21; but when the operating-lever is permitted to return by the release of the pressure thereon to the position in dotted lines in Fig. 11 it will tilt the controlling member 37 and move the stop 43 out of engagement with the projection 31, allowing the master member to complete its movement and release the shutter-leaves.

The term "bulb" exposure is used herein in the sense that it is understood by those skilled in the art to denote an exposure in which the shutter is held open by pressure upon the part that controls the stops or catches, such as the lever 11 or the bulb of the pneumatic engine operating it.

The shutter herein shown is very simple and compact, and by constructing the master member, as described, of a single piece of spring material the cost and number of parts are materially reduced, and the device is found in practice to be admirably adapted for the purpose.

I claim as my invention—

1. In a shutter, the combination with a pair of overlapping interchangeable shutter-leaves each provided with a pivot-aperture and a projecting tongue, of an oscillatory actuating member having two pins or projections thereon between which the overlapping tongues on the shutter project.

2. The combination with a shutter proper normally held closed by a spring, a projection movable therewith and a movable operating member having a projection thereon, of a pivoted spring-actuated master member having laterally-yielding and oppositely-arranged latches coöperating with the projections on the operating member and shutter respectively when moved in one direction relatively.

3. The combination with the shutter proper, a spring for closing it, a projection moving with the shutter and a pivoted operating member, of a pivoted spring-operated master member and a latch between the master member and shutter yielding in a plane parallel with that of the pivot, and a latch between the operating member and the master member.

4. The combination with the shutter proper, the actuating member connected thereto and the spring, of a pivoted spring-operated master member, a laterally-yielding latch arranged between the master member and actuating member and a projection on the master member, an adjustable spring-operated controlling member having time and bulb stops adapted to coöperate with the master member and a pivoted operating member coöperating with one of the latch projections on the master member and operating and controlling the controlling member.

5. The combination with a shutter and a spring for closing it, of a movable operating member, a pivoted spring-operated master member and latch connections yielding in the plane of the pivot of the member and arranged between the master member and the operating member and between the master member and the shutter-actuating member, said latch connections permitting the free movement of the master member relative to the shutter when moved by the operating member and permitting the free movement of the master member relative to the operating member when actuating the shutter.

6. The combination with the shutter proper, and a spring for closing it, a pivoted operating member, and a pivoted master member having the two oppositely-arranged inclined and transversely-yielding latch portions, and opposing operating-shoulders, one of said latch portions and its shoulder being adapted to coöperate with the operating member and the other with the shutter, whereby the master member may be operated against its spring by the operating member without actuating the shutter and may be operated in the other direction by its spring free of the operating member.

7. The combination with a shutter proper, a spring for closing it and a projection moving with the shutter, of a pivoted operating member having a projection, and a pivoted spring-operated master member having the inclined transversely-yielding latch portion provided with an operating-shoulder coöperating with the shutter projection, and the inclined and laterally-yielding latch portion provided with an operating-shoulder coöperating with the projection on the operating member, the projections and shoulders being movable through intersecting arcs.

8. The combination with the shutter proper, a spring for closing it and a movable shutter-actuating member, of an operating member, a spring for operating it in one direction, a pivoted master member, a spring for operating it in one direction, latch connections between the master member and operating member and between the master member and the shutter-actuating member, said latch connections being movable through intersecting paths for a portion of their movement, and yielding in the plane of the pivots of the parts when moved in one direction, whereby the master member may be moved by the operating member against its spring and released without actuating the shutter, and when moved by its spring will actuate and release the shutter without positively engaging the operating member.

9. The combination with the shutter proper, and a spring for closing it, of an operating member, and a pivoted spring-operated master member having the laterally-yielding spring ends inclined on one side and having the shoulders on the other, the shoulder on one of said projections operating and releasing the shutter when the master member is moved by its spring and the shoulder on the other projection being engaged by and released from the operating member when the latter is moved in a direction to cause the movement of the master member against its spring.

10. The combination with the shutter and a spring for closing it, of an operating member and a pivoted spring-actuated master member composed of spring material having the projections engaging the shutter and operating members respectively, movable through arcs intersecting the parts and having the shoulders on one side and inclines on the other.

11. The combination with the shutter proper, the spring for closing it and the actuating-lever connected to the shutter having the stud thereon, of a pivoted spring-operated master-lever composed of spring material and having the projection thereon provided with the shoulder on one side and the incline on the other adapted to engage the projection on the actuating-lever.

12. The combination with the shutter proper, the spring for closing it and the actuating-lever, of an operating member, a spring-operated master member having two laterally-yielding latch projections coöperating with the shutter and operating member respectively when moved relatively in opposite directions, a controlling member having bulb and time stops thereon coöperating with the master member to control it, adjusting devices for the controlling member, said operating member coöperating with and actuating the controlling member when either the time or bulb stops are in coöperative relation with the master member.

13. The combination with the shutter proper, the lever connected thereto and the spring, of the pivoted master member having the laterally-yielding latch projection thereon coöperating with the lever, the adjustable controlling member having the separate stops thereon adapted to coöperate with the master member, and means for moving the master member in one direction and operating the controlling member.

14. The combination with the shutter proper, the actuating member connected thereto and the spring, of the spring-operated pivoted master member having the laterally-yielding projection thereon coöperating with the actuating member, and the controlling member having the separate stops thereon adapted to coöperate with the master member, means for adjusting the controlling member to bring either stop into coöperative relation with the master member, and an operating member for actuating the master member in one direction and operating the controlling member.

15. The combination with the shutter proper, a movable master member opening and controlling the shutter, of the pivoted controlling member having the bulb-stop, the time-stop having the inclined portion and the projection 36 thereon, and the movable operating member coöperating with the projection 36 on the controlling member and having a latch connection with the master member and adjusting devices for the controlling member.

16. The combination with the spring-operated shutter, the lever 21 and the pivoted spring-operated master member having the inclined laterally-yielding latch projections 25 and 28 thereon, of the pivoted operating member having the projection 34 coöperating with the latch projection 28 to move the master member in one direction only.

17. The combination with the spring-operated shutter, the lever 21 having the projection thereon, and the pivoted spring-operated master member having the inclined and laterally-yielding latch projections 25 and 28 and the projection 31, of the pivoted operating member 32 having the projection 34 coöperating with the latch projection 28, and adjustable controlling devices adapted to engage the projection 31 for controlling the movement of the master member, said controlling devices being released from engagement by the operating-lever.

18. The combination with the shutter, a spring for closing it and a projection 24 connected thereto, of the master member having the laterally-yielding spring projections 25 and 28 and the projection 31 thereon, the controlling member having the stops 41 and 43 and the projection 36, the spring for operating it, the pivoted operating member having the projection 34 thereon coöperating with the projection 36 on the controlling member, the projection 34 coöperating with the latch projection 28 on the master member, and means for adjusting the controlling member.

19. The combination with a spring-operated shutter and a pivoted operating member, of a master member for operating the shutter consisting of a single piece of spring material having two laterally-inclined latch projections thereon, one operating the shutter when said member is moved in one direction, and the other engaged by the operating member to move the master member in the opposite direction.

20. In a photographic shutter, the combination with a movable part having a projection 31 thereon moving in a fixed path, of the pivoted controlling member having the stops 41 and 43 adapted to engage the projection 31 and the projection 36 thereon, an adjustable stop 45, a spring for holding the member against the last-mentioned stop, and a movable member or part coöperating with the projection 36 to release the controlling member from the projection 31.

21. The combination with the shutter proper, and lever 21, of a master member having a latch connection with the lever 21, a single controlling member having time and bulb stops operating on the master member, means for adjusting said controlling member, and a pivoted operating member having two arms, one having a latch connection with the master member and the other operating upon the controlling member.

THEODOR BRUECK.

Witnesses:
GEORGE HOMMEL,
A. S. HARRINGTON.